United States Patent
Amaral et al.

(10) Patent No.: US 6,428,012 B1
(45) Date of Patent: Aug. 6, 2002

(54) COMPACT DRIVE SHAFT FLOATING SEAL SYSTEM

(75) Inventors: Antonio M. Amaral, East Providence; Stanley J. Olson, Newport; Anthony N. Corvelli, Bristol, all of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 41 days.

(21) Appl. No.: 09/652,304

(22) Filed: Aug. 28, 2000

(51) Int. Cl.[7] ............................................... F16J 15/34
(52) U.S. Cl. ...................................... 277/372; 277/384
(58) Field of Search ................................ 277/372, 384, 277/500, 549, 551, 559, 560, 563, 565, 571, 572, 579, 580

(56) References Cited

U.S. PATENT DOCUMENTS

| | | | | |
|---|---|---|---|---|
| 2,186,537 A | * | 1/1940 | Salisbury | 277/508 |
| 2,366,729 A | * | 1/1945 | Hanson | 277/516 |
| 3,331,609 A | * | 7/1967 | Moran | 277/567 |
| 3,927,890 A | * | 12/1975 | Adams, Jr. | 277/412 |
| 4,494,760 A | * | 1/1985 | Spargo | 277/580 |
| 5,039,115 A | * | 8/1991 | Hebert et al. | 277/347 |
| 5,452,904 A | * | 9/1995 | Huber et al. | 277/535 |
| 6,261,069 B1 | * | 7/2001 | Djordjevic | 417/313 |

* cited by examiner

*Primary Examiner*—J. J. Swann
*Assistant Examiner*—Michael W White
(74) *Attorney, Agent, or Firm*—Michael J. McGowan; James M. Kasischke; Prithvi C. Lall

(57) ABSTRACT

A compact floating seal system for sealing a rotating shaft within a structure. The floating seal system has a cylindrical outer seal housing positioned within the structure with a cylindrical internal recessed region formed in the outer seal housing and a retaining flange extending into the internal recessed region. An axial retaining means axially retains the outer seal housing against the structure, and an outer torque member prevents rotation of the outer seal housing with respect to the structure. An inner seal housing is retained within the internal recessed region and abuts the retaining flange for preventing axial movement of the housing. The inner seal housing has a shaft aperture therethrough. First and second sealing member retaining grooves formed within the shaft aperture retain O-rings. A lubricant recess is formed within the shaft aperture between the grooves. A rotation prevention means allows radial deflection of the inner seal housing within the outer seal housing but prevents rotation of the inner seal housing with respect to the outer seal housing.

12 Claims, 5 Drawing Sheets

COMPACT DRIVE SHAFT FLOATING SEAL SYSTEM

CROSS-REFERENCE TO RELATED PATENT APPLICATION

This patent application is co-pending with two related patent applications filed on the same date, entitled: AXIALLY PRESSURE BALANCED FLOATING SEAL SYSTEM, Attorney Docket No. 78498, and RADIALLY PRESSURE BALANCED FLOATING SEAL SYSTEM, Attorney Docket No. 78499, both having the same inventors as this patent application.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to sealing assemblies used on rotating shafts and more particularly, relates to a compact floating seal system used on a drive shaft.

(2) Description of the Prior Art

O-ring seals are commonly used to seal rotating shafts used in vehicles or machinery. For example, in an existing torpedo tail cone assembly 10, FIG. 1, the drive shaft 12 of the torpedo is typically sealed with an O-ring seal system having a seal housing 14 and an O-ring seal 15 within a groove in an internal annular surface of the housing 14. The seal housing 14 is located within the tail cone housing 16 near the bearing 18. When the torpedoes have stable and concentric shaft bearing mounts relative to the seal, non-floating seal housings can be used, and these housings will still maintain reasonable clearance to prevent rubbing between the shaft 12 and the seal housing 14. Larger shafts that are mounted soft enough to move or float relative to the seal housing require floating seal housings. The floating seal housing moves with the drive shaft 12 generally in a radial direction as indicated by arrow 2 maintaining clearance of the shaft 12 and preventing the shaft 12 from rubbing against the seal housing 14.

In order to allow greater torpedo reliability and operations at depth, replacement of the prior art seal described above was proposed. The replacement seal must fit in the envelope occupied by the existing seal and seal on the same diameter shaft. Furthermore, the seal must be capable of supporting additional pressure at the rotational speed of the torpedo drive shaft.

Some methods for allowing greater reliability of dynamic O-ring seals include use of a lubricant recess and canting. A lubricant recess containing oil or another type of lubricant is provided between two O-rings. Canting (or slanting) the O-rings within the seal housing increases seal life by facilitating active lubrication of the seals as the shaft rotates. This technique improves the life span and capability of the seals by reducing the friction between the O-rings and the shaft.

SUMMARY OF THE INVENTION

One object of the present invention is a high pressure, dynamic seal system that minimizes the potential of rubbing and failure.

Another object of the present invention is the provision of a seal system that floats with the shaft at low pressures.

Yet another object of the present invention is a reliable high pressure seal system in which the sealing members are effectively lubricated.

A further object of the present invention is a high pressure seal system fitting that can be used in current systems.

Accordingly, the present invention provides a compact floating seal system for sealing a rotating shaft within a structure. The floating seal system has a cylindrical outer seal housing positioned within the structure with a cylindrical internal recessed region formed in the outer seal housing and a retaining flange extending into the internal recessed region. An axial retaining means axially retains the outer seal housing against the structure, and an outer torque member prevents rotation of the outer seal housing with respect to the structure. An inner seal housing is retained within the internal recessed region and abuts the retaining flange for preventing axial movement of the housing. The inner seal housing has a shaft aperture therethrough. First and second sealing member retaining grooves formed within the shaft aperture retain O-rings. A lubricant recess is formed within the shaft aperture between the grooves. A rotation prevention means allows radial deflection of the inner seal housing within the outer seal housing but prevents rotation of the inner seal housing with respect to the outer seal housing.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
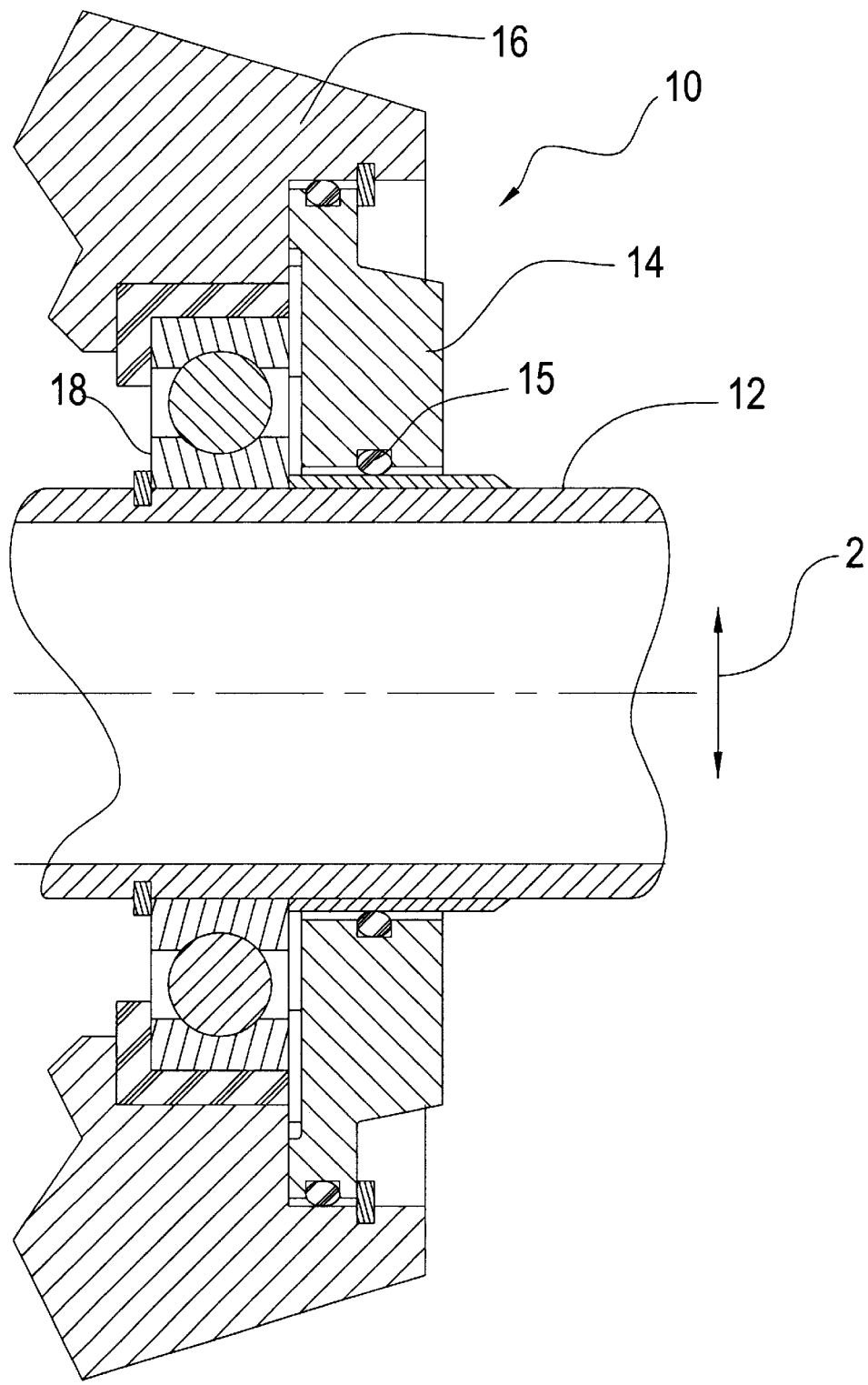
FIG. 1 is a cross-sectional view of a torpedo tail cone assembly having an O-ring seal system for sealing a drive shaft according to the prior art.
Figure 2:
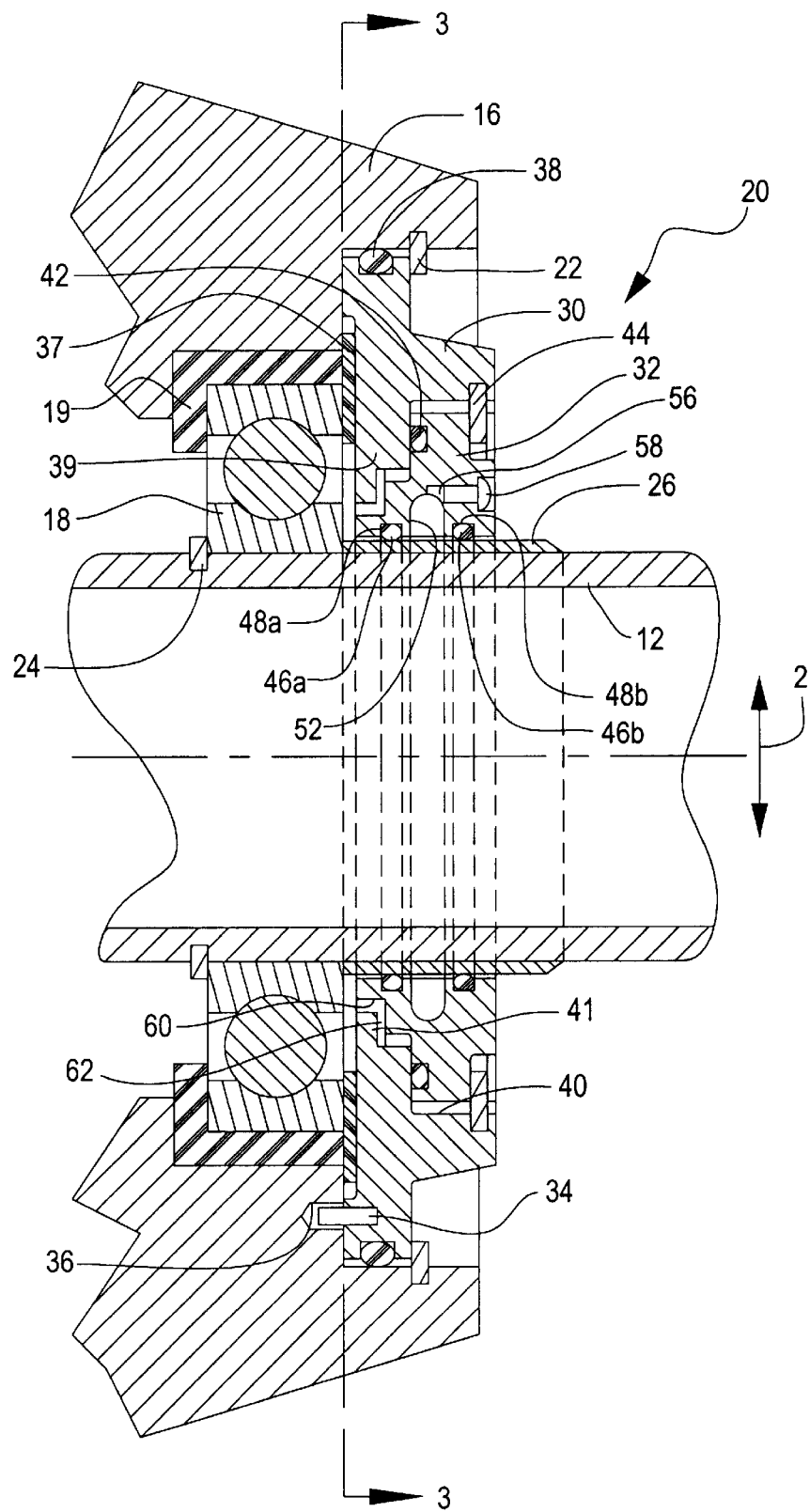
FIG. 2 is cross-sectional view of a high pressure dynamic seal system according to the present invention.

A compact drive shaft floating seal system, FIG. 2, according to the present invention, is used to seal a rotating shaft 12 while allowing movement of the shaft in a radial direction 2 at ambient pressures. In this example, the floating seal system 20 is assembled in a tail cone housing 16 of a torpedo proximate the shaft bearings 18, which are preferably mounted in a resilient elastomer 19. The floating seal system 20 is held in place by a spiral ring 22 or other similar retaining member or mechanism, and the bearings 18 are held in place by a retaining ring 24 or other similar retaining member or mechanism. A seal ring 26 made of ground and polished, hard, chrome-plated, stainless steel or alternative compatible material is preferably disposed around the shaft 12 between the shaft 12 and the floating seal system 20. The present invention contemplates other uses for the floating seal system 20 in other types of vehicles or with rotating shafts in other types of machines.

The floating seal system 20 includes an outer seal housing 30 and an inner seal housing 32 that "floats" relative to the outer seal housing 30. The outer seal housing 30 and inner seal housing 32 are preferably made of anodized aluminum or other compatible material, and the radial wall thickness of the inner seal housing 32 is in the range of about 0.6 inches depending on the application. One or more pins 34 or other similar members extend from the outer seal housing 30 to a pocket 36 in the tail cone housing 16 to prevent rotation of the outer seal housing 30 relative to the tail cone housing 16. Vibrations from outer seal housing 30 are damped from reaching tail cone housing 16 by a rubber ring 37 joined adhesively to outer seal housing 30. An outer O-ring 38 or other type of sealing member is preferably placed between the outer seal housing 30 and the tail cone housing 16.

The outer seal housing 30 includes an internal recessed region 40, for receiving the inner seal housing 32, such that the outer and inner seal housings 30, 32 form a shaft receiving aperture that receives the rotating shaft 12. Inner seal housing 32 is nested against a retaining flange 39 extending radially inward into recessed region 40. A torque tab 41 extending from outer seal housing 30 retaining flange 39 prevents inner seal housing 32 from rotating relative to outer seal housing 30. Torque tab 41 will be disclosed in further detail below. The inner seal housing 32 is movable generally in the radial direction 2 with respect to the outer seal housing 30 to allow radial movement of the shaft 12. The inner seal housing 32 is preferably retained within the outer seal housing 30 with a retaining ring 44 positioned within a groove in the wall of recessed region 40; however, another similar retaining member or mechanism can be used for this purpose. Inner seal housing 32 is sealed against outer seal housing 30 retaining flange 39 by an intermediate O-ring 42. Inner seal housing 32 can be removed from outer seal housing 30 without removing outer seal housing from tail cone housing 16 by removing retaining ring 44.

Inner seal housing 32 is sealed against seal ring 26 by two O-rings 46a and 46b housed within O-ring grooves 48a and 48b. Preferably, only the O-rings 46a, 46b touch the seal ring 26 around the shaft 12. A lubricant recess 52 is disposed between O-ring grooves 48a and 48b formed within an internal annular surface 54 of the inner seal housing 32 for containing oil or other lubricant. A first hole 56 is used to inject the oil into the recess 52 (e.g., to about 60 to 70% full) and is sealed with a self sealing plug 58 or other sealing mechanism. A second hole (not shown) can also be provided for venting during filling through the first hole 56.

Inner seal housing 32 will align itself with seal ring 26 on shaft 12 by radially repositioning itself. This will only occur when pressure on one face of inner seal housing 32 does not exceed pressure on the other face beyond a pressure differential. This pressure differential is dependent on the stiffness of intermediate O-ring 42 and the axial spacing between inner seal housing 32 and outer seal housing 30. During alignment, O-rings 46a and 46b touch the seal ring 26 and slide inner seal housing 32 radially until properly positioned. Radial self-positioning of housing 32 allows the seal assembly 20 to be manufactured with looser tolerances and limits potential contact between inner seal housing 32 and seal ring 26. At pressures greater than the pressure differential, inner seal housing 32 is pushed against outer seal housing 30, and the housings make contact in the returning flange 39 region. Friction between the housings prevents radial movement of the inner seal housing 32.

Figure 3:
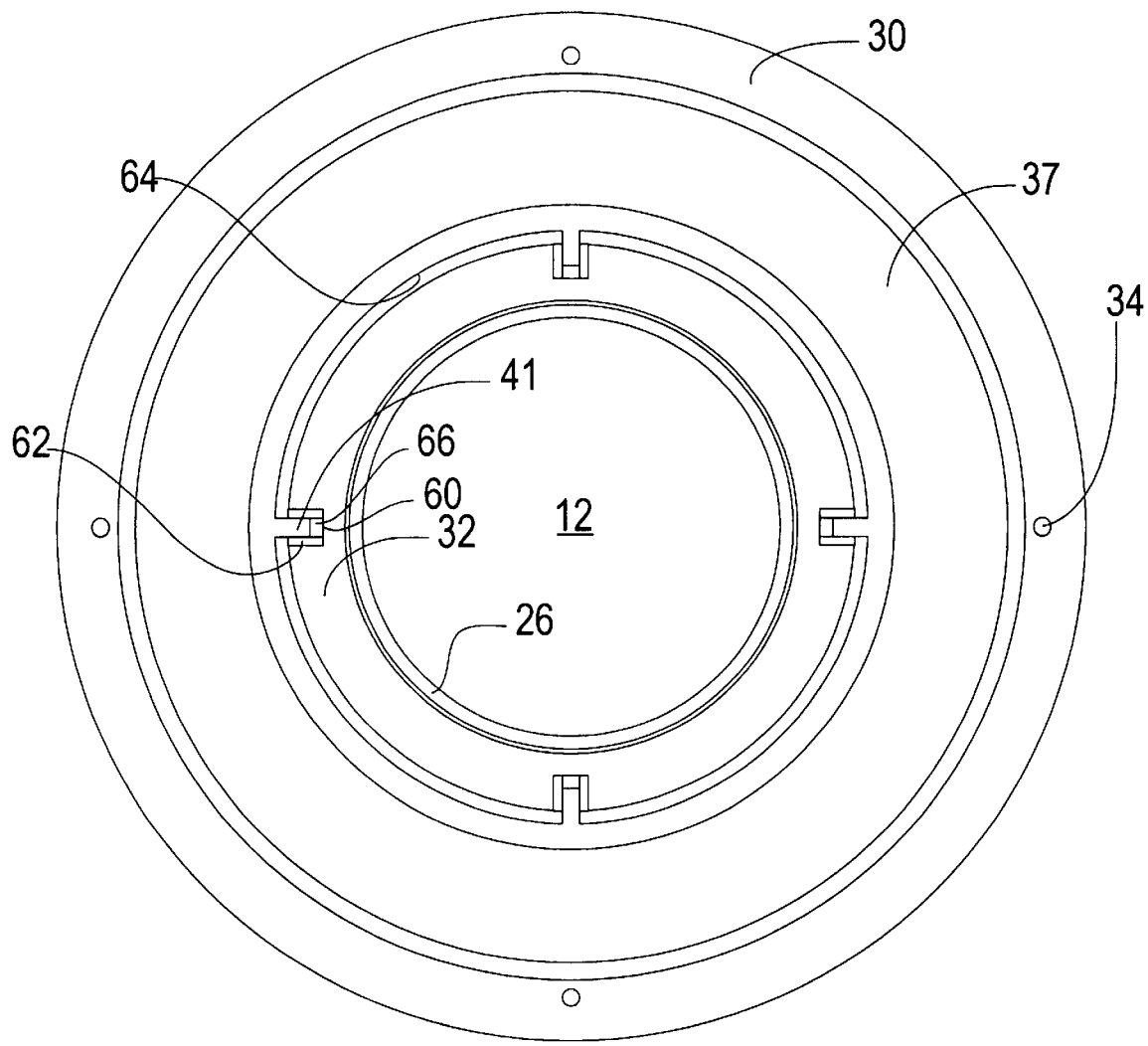
FIG. 3 is an end view of a high pressure dynamic seal system taken along line 3—3 of FIG. 2.

FIG. 3 shows a view of FIG. 2 taken along line 3—3. This view provides the details of torque tabs 41. In a first embodiment torque tab 41 extends from outer seal housing 30 into a notch 60 formed in inner seal housing 32. An elastomeric bumper 62 is bonded on the contact surface either within notch 60 or on tab 41. Bumper 62 is made from an elastomeric material such as high density rubber having a low spring rate. Because torque transferred from housing 32 through bumper 62 to tab 41 is distributed relatively evenly, there are minimal side forces as a result of the torque and off-set displacement of the shaft 12 relative to outer housing 30. A clearance 64 is provided between inner seal housing 32 and outer seal housing 30, and a clearance 66 is provided between tab 41 end and notch 60 base. Clearances 64 and 66 provide for maximum eccentricity of the shaft 12 centerline.

Figure 4A:
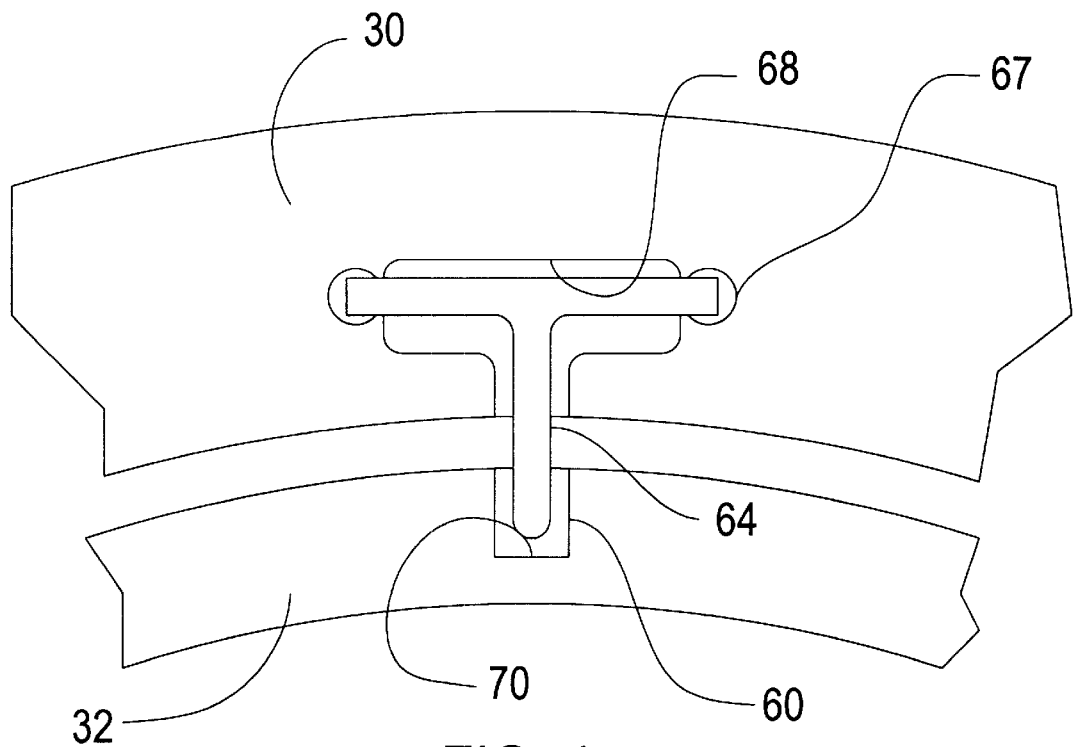
FIG. 4a is a detail view of torque tab according to a first alternative embodiment.
Figure 4B:
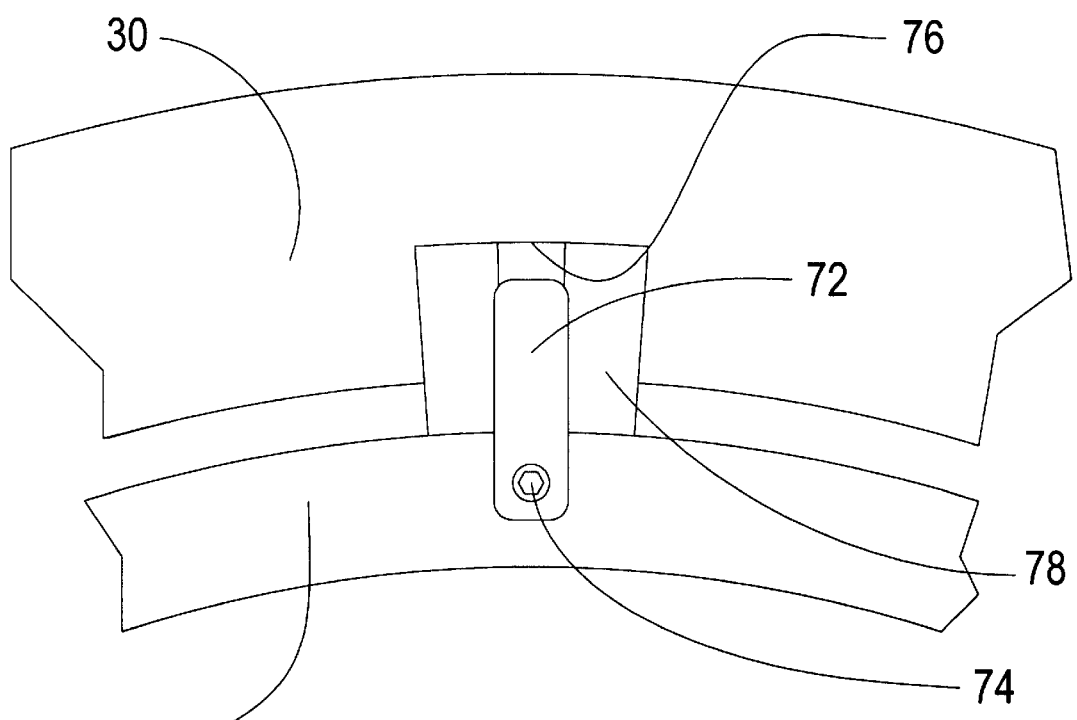
FIG. 4b is a detail view of torque tab according to a second alternative embodiment.

FIGS. 4a and 4b show alternative embodiments of torque tab 41, notch 60 and bumper 62. In FIG. 4a, there is shown a spring torque tab 65 which is bonded at the ends 67 of a machined slot 68 in outer seal housing 30. Spring torque tab 65 contacts inner seal housing 32 in slot 61 and absorbs forces tending to rotate the inner seal housing 32. A clearance 70 is provided between spring torque tab 65 and end of slot 61 for allowing deflection of shaft 12 (See FIG. 3). Spring torque tab 65 can be made from a metal, plastic or composite material having a low spring rate with clearance for compound bending and torque in either direction.

FIG. 4b shows an alternative embodiment of torque tab 41 having a torque member 72 joined by bolt 74 to inner seal housing 32. Torque member 72 extends into an outer notch 76 formed in outer seal housing 30. Pads 78 are provided on one or both sides of outer notch 76. As in the other embodiments, a clearance exists between the end of torque member 72 and the base of notch 76.

From this embodiment, it is apparent that torque tab can be joined to either outer or inner seal housing, and notch can be formed in the other housing. Placement of the torque tab 41 or 72 on the inner seal housing may require design accommodations to be made in outer seal housing 30 and intermediate O-ring 42. Accordingly, placement of torque tab on the outer seal housing is preferred.

Figure 5:
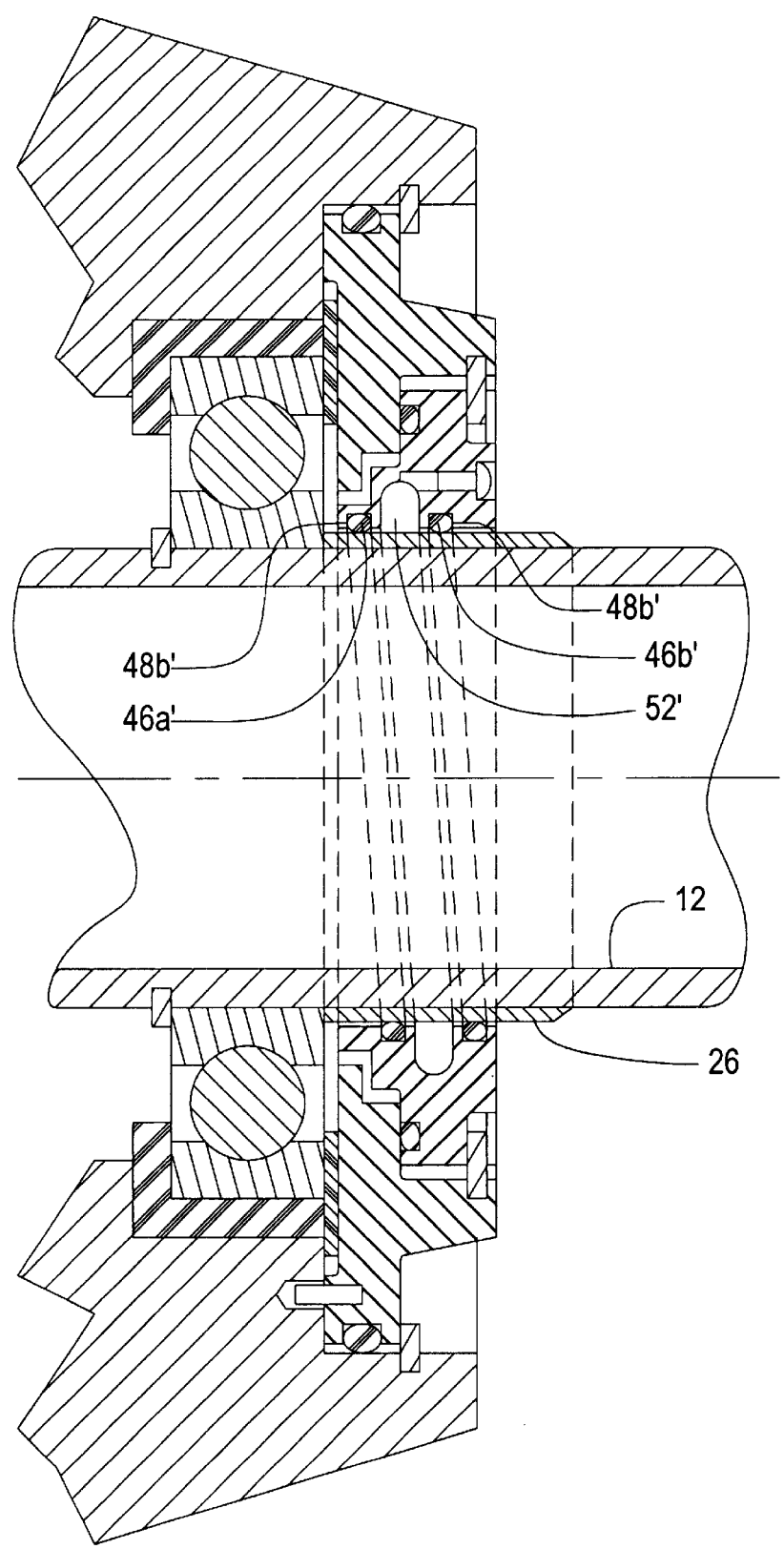
FIG. 5 is a cross-sectional view of an alternate embodiment of a high pressure dynamic seal system according to the present invention having canted O-ring grooves.

FIG. 5 shows an alternative embodiment of the high pressure dynamic seal system of the current invention. In this embodiment, O-ring grooves 48a and 48b are provided as canted O-ring grooves 48a' and 48b'. Lubricant recess 52 is also provided as a canted lubricant recess 52'. Canting the O-ring grooves 48a' and 48b' provides lubricant over seal ring 26 and increases the life of the O-rings because as shaft 12 rotates O-rings 46a' and 46b' wipe lubricant back and forth across seal ring 26. A disadvantage of this embodiment is the creation of an unbalanced load on inner seal housing 32. This load may cause contact between the housings at lower differential pressures than the embodiment shown in FIG. 2.

In light of the above, it is therefore understood that within the scope of the appended claims, the invention may be practiced otherwise than as specifically described.

What is claimed is:

1. A compact floating seal system for sealing a rotating shaft within a structure, said floating seal system comprising:
   a cylindrical outer seal housing positioned within said structure, said outer seal housing having a cylindrical internal recessed region formed therein and a retaining flange extending into said internal recessed region;
   an inner seal housing received in said outer housing internal recessed region and abutting said outer seal housing retaining flange for preventing axial movement in a first direction, said inner seal housing having an annular internal surface defining a shaft aperture through said inner seal housing, a lubricant recess formed within said annular internal surface of said inner seal housing for receiving lubricant, and first and second sealing member retaining grooves formed within said annular internal surface of said inner seal housing;

first and second inner sealing members disposed within respective said first and second sealing member retaining grooves for positioning against said rotating shaft; and a spring torque tab extending from said outer seal housing radially into said outer housing internal recessed region, said inner seal housing having a notch formed therein for receiving said spring torque tab, said spring torque tab contacting said inner seal housing notch when said inner seal housing deflects relative to said outer seal housing wherein said spring torque tab has an angular spring rate resisting movement between said inner seal housing and said outer seal housing when said spring torque tab contacts said inner seal housing notch.

2. The system of claim 1 further comprising:

an axial retaining means fixed to said structure in contact with said outer seal housing for retaining said outer seal housing against said structure;

an outer torque member positioned between said outer seal housing and said structure for preventing rotation of said outer seal housing with respect to said structure;

an elastomeric ring disposed between said outer seal housing and said structure for damping axial movement of said outer seal housing against said structure; and an outer sealing means disposed between said outer seal housing and said structure for preventing pressurized fluid from leaking therethrough.

3. The system of claim 1 further comprising:

an inner seal housing axial retaining means joined between said outer seal housing and said inner seal housing for restraining movement of said inner seal housing in a second axial direction opposite said first axial direction while allowing radial deflection; and an intermediate sealing means positioned between said inner seal housing and said outer seal housing retaining flange and allowing radial movement of said inner seal housing within said outer seal housing.

4. The system of claim 3 wherein:

said outer seal housing has a groove formed within said cylindrical internal recessed region; and said inner seal housing axial retaining means comprises a retaining ring disposed in said groove and extending inward to prevent axial motion of said inner seal housing.

5. The system of claim 1 wherein said first and second seal member retaining grooves are canted with respect to a plane perpendicular to said shaft, said first and second inner sealing members being positioned in said canted grooves.

6. The system of claim 5 wherein said lubricant recess is canted with respect to a plane perpendicular to said shaft.

7. The system of claim 1 wherein:

said outer seal housing has a machined slot having a T-shaped configuration formed therein, the inward facing opening of the machined slot being the base of the T; and said spring torque tab has two arms and a base in a configuration conforming to said machined slot, said arms being mounted in said outer seal housing machined slot at the ends of the arms, said base of the spring torque tab extending inward into said inner seal housing notch, and said angular spring rate resisting movement being obtained by lateral deflection of the base of the spring torque tab and rotational deflection at the meeting of the arms and base of the spring torque tab.

8. A compact floating seal system for sealing a rotating shaft within a structure, said floating seal system comprising:

a cylindrical outer seal housing positioned within said structure, said outer seal housing having a cylindrical internal recessed region formed therein and a retaining flange extending into said internal recessed region;

an axial retaining means fixed to said structure in contact with said outer seal housing for retaining said outer seal housing against said structure;

an outer torque member positioned between said outer seal housing and said structure for preventing rotation of said outer seal housing with respect to said structure;

an elastomeric ring disposed between said outer seal housing and said structure for damping axial movement of said outer seal housing against said structure;

an outer sealing means disposed between said outer seal housing and said structure for preventing pressurized fluid from leaking therethrough;

an inner seal housing received in said outer housing internal recessed region and abutting said outer seal housing retaining flange for preventing axial movement in a first direction, said inner seal housing having an annular internal surface defining a shaft aperture through said inner seal housing, a lubricant recess formed within said annular internal surface of said inner seal housing for receiving lubricant, and first and second sealing member retaining grooves formed within said annular internal surface of said inner seal housing;

a spring torque tab joined to a selected one of said inner seal housing and said outer seal housing and extending into a notch formed in the other selected one of said inner seal housing and said outer seal housing, said spring torque tab contacting said notch wall when said inner seal housing deflects relative to said outer seal housing, and said spring torque tab has an angular spring rate resisting movement between said inner seal housing and said outer seal housing when said torque tab contacts said notch wall;

an inner seal housing axial retaining means joined between said outer seal housing and said inner seal housing for restraining movement of said inner seal housing in a second axial direction opposite said first axial direction while allowing radial deflection;

an intermediate sealing means positioned between said inner seal housing and said outer seal housing retaining flange and allowing radial movement of said inner seal housing within said outer seal housing; and first and second inner sealing members disposed within respective said first and second sealing member retaining grooves for positioning against said rotating shaft.

9. The system of claim 8 wherein:

said outer seal housing has a groove formed within said cylindrical internal recessed region; and said inner seal housing axial retaining means comprises a retaining ring disposed in said groove and extending inward to prevent axial motion of said inner seal housing.

10. The system of claim 9 wherein:

said first and second seal member retaining grooves are canted with respect to a plane perpendicular to said shaft, said first and second inner sealing members being positioned in said canted grooves; and said lubricant recess is canted with respect to a plane perpendicular to said shaft.

11. A compact floating seal system for sealing a rotating shaft within a structure, said floating seal system comprising:

a cylindrical outer seal housing positioned within said structure, said outer seal housing having a cylindrical internal recessed region formed therein and a retaining flange extending into said internal recessed region;

an inner seal housing received in said outer housing internal recessed region and abutting said outer seal housing retaining flange for preventing axial movement in a first direction, said inner seal housing having an annular internal surface defining a shaft aperture through said inner seal housing, a lubricant recess formed within said annular internal surface of said inner seal housing for receiving lubricant, and first and second sealing member retaining grooves formed within said annular internal surface of said inner seal housing;

first and second inner sealing members disposed within respective said first and second sealing member retaining grooves for positioning against said rotating shaft; and a spring torque tab extending from said inner seal housing radially out to said outer housing internal recessed region, said outer seal housing having a notch formed therein for receiving said spring torque tab, said spring torque tab contacting said outer seal housing notch when said inner seal housing deflects relative to said outer seal housing wherein said spring torque tab has an angular spring rate resisting movement between said inner seal housing and said outer seal housing when said spring torque tab contacts said outer seal housing notch.

12. The system of claim 1 wherein:

said inner seal housing has a machined slot having a T-shaped configuration formed therein, the outward facing opening of the machined slot being the base of the T; and said spring torque tab has two arms and a base in a configuration conforming to said machined slot, said arms being mounted in said inner seal housing machined slot at the ends of the arms, said base of the spring torque tab extending outward into said outer seal housing notch, and said angular spring rate resisting movement being obtained by lateral deflection of the base of the spring torque tab and rotational deflection at the meeting of the arms and base of the spring torque tab.

* * * * *